June 2, 1970  A. G. COMER ET AL  3,515,276
METHOD AND APPARATUS FOR DECONTAMINATING FLUID
Filed March 11, 1968  2 Sheets-Sheet 1

INVENTORS.
ERNEST C. FITCH, JR.
ROBERT E. REED
BY  ALVA G. COMER

Head & Johnson
ATTORNEYS

United States Patent Office 3,515,276
Patented June 2, 1970

3,515,276
METHOD AND APPARATUS FOR
DECONTAMINATING FLUID
Alva Gene Comer, Robert E. Reed, and Ernest C. Fitch,
Jr., Stillwater, Okla., assignors to Cyclonics Corporation, Dallas, Tex., a corporation of Texas
Continuation-in-part of application Ser. No. 682,766,
Nov. 14, 1967. This application Mar. 11, 1968, Ser.
No. 719,819
Int. Cl. B01d 5/00, 50/00
U.S. Cl. 210—26
23 Claims

ABSTRACT OF THE DISCLOSURE

A method and apparatus for decontaminating dry-cleaning fluid in a closed, recycled system including the injection of the fluid having contaminants therein into a hydroclone separator wherein the fluid is subjected to centrifugal forces and wherein solid contaminants are ejected from the solution by such centrifugal forces, the ejected contaminants passing out of the hydroclone and into a receiving chamber, and the fluid having solid contaminants removed therefrom passing out of the hydroclone through a fluid exit. A portion of the hydroclone-cleaned fluid is passed through a chemical bed of activated charcoal cartridges wherein dissolved contaminants are removed, and a portion of the fluid is passed through a barrier filter unit of paper filter cartridges wherein remaining solid contaminants and any sloughed chemicals from the chemical bed are removed, this fluid then being mixed back into a bypass flow and recycled. One embodiment of the invention includes photoelectric means for detecting the clarity of the fluid containing ejected contaminant passing out of the hydroclone in conjunction with circuitry for automatically terminating the decontamination cycle when the clarity of the fluid reaches a predetermined level, and different arrangements are disclosed for extracting vapor and fluid from collected solid particles separated from the fluid by the hydroclone separator.

CROSS-REFERENCE

This application is a continuation in part of our pending application Ser. No. 682,766, filed Nov. 14, 1967, and now abandoned.

BACKGROUND OF THE INVENTION

This invention relates to the decontamination of fluid that is contaminated with both dissolved and solid contaminants and, more particularly, to the decontamination of fluids utilized in dry-cleaning processes in which the fluid in a system is circulated through a work chamber containing the garments to be cleaned, picking up contaminants from the garments as part of the cleaning process, and then is passed through a decontaminating apparatus for removal of the contaminants preparatory to reuse of the fluid.

Known devices, systems and arrangements for removing contaminants from cleaning fluid function with varying degrees of success, but most are relatively complex and expensive and are only partially successful in removing contaminants to the extent necessary for thorough and efficient dry cleaning. Some systems have used screen wire filters precoated with various powders such as diatomaceous earth and charcoal, requiring a relatively high degree of skill to achieve satisfactory cleaning and subject to other shortcomings resulting from the use of precoating powders. Other systems have attempted to use cartridge elements of paper and charcoal, but success with this approach has been limited because of the expense and difficulties in operation with such elements in view of the high volumes of fluid involved. In addition, conventional systems typically depend upon a preselected time cycle and lack precise controls for correlating the duration of the cycle with the actual requirements of the batch of garments being cleaned. Accordingly, the cycle either is longer than necessary, resulting in inefficient utilization of equipment, or is shorter than necessary, resulting in incomplete cleaning of the garments.

SUMMARY OF THE INVENTION

The primary object of the present invention is to provide a new and improved method and apparatus for decontaminating dry-cleaning fluid, constituting a distinct departure from conventional practices in this industry and characterized by relative simplicity and economy of structure and operation as well as a higher degree of effectiveness in removing contaminants from dry-cleaning fluid. A more specific object is to combine conventional chemical and filter cleaners for dry-cleaning fluid in a novel manner with a hydroclone separator for removing larger solid particles from the fluid by centrifugal action prior to exposing the fluid to the conventional cleaners, thereby minimizing clogging of the latter by lint and the like from the garments and providing a practical and highly effective dry-cleaning apparatus. Another object is to pass the precleaned fluid from the hydroclone separator through the chemical and filter units in a novel manner for optimum flow and effective cleaning despite the fact that all fluid is not subjected to both chemical and filtering actions during each flow cycle.

Still another object is to control the duration of the dry-cleaning cycle for each batch of garments automatically in response to the condition of the fluid itself, using this condition as an indication of the progress of the cleaning operation to insure that the cycle is continued only long enough to achieve the desired degree of cleaning prior to termination of the cycle. A further object is to minimize the amount of fluid removed from the system with the separated solid contaminants.

Other objects and advantages of the invention will be apparent from the following detailed description, taken in conjunction with the accompanying drawings and claims.

DETAILED DESCRIPTION

Figure 1:
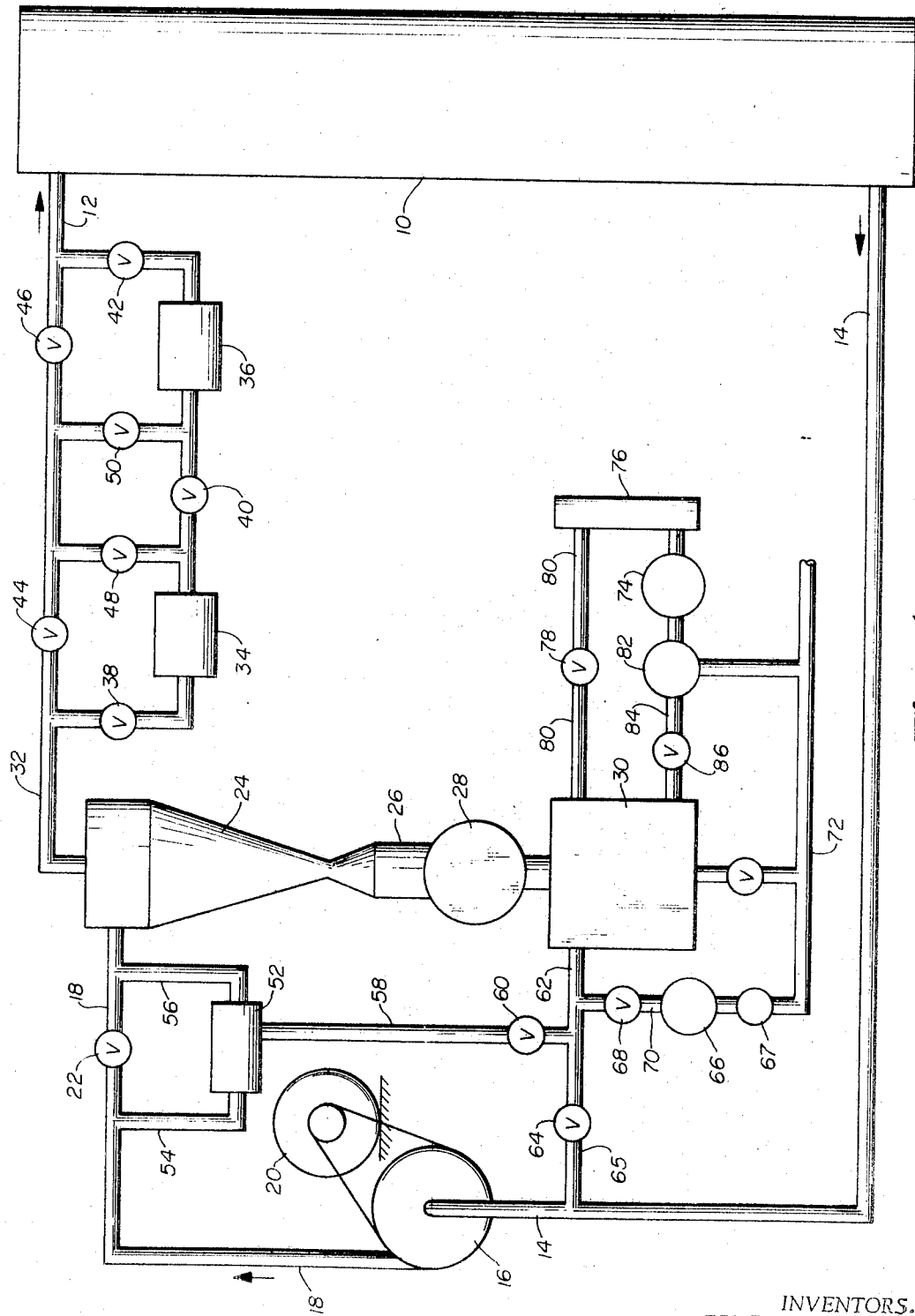
FIG. 1 is a schematic view of a dry-cleaning system and decontaminating apparatus embodying the novel features of the present invention and incorporating several different alternative arrangements for minimizing the amount of fluid removed from the system with the separated contaminants.

As shown in the drawings for purposes of illustration, the invention is embodied in a closed system for passing dry-cleaning fluid through a cleaning station 10 and a batch of garments to be cleaned at this station, then circulating the contaminated fluid from the garments through a decontaminating apparatus for removal of the contaminants picked up in passing through the garments, and finally returning clean fluid to the work station for recirculation through the garments and the decontaminating apparatus. In a typical application, fluid passes continuously through the batch of garments being cleaned and circulates through the system several times for each batch until substantially all soluble stains and solid particles, including dirt, grease, lint, and free dyes, have been removed from the garments.

The cleaning station 10 (FIG. 1) may be a conventional dry cleaner and herein is shown as a tank having an inlet conduit 12 for admitting clean fluid adjacent its upper end and an outlet conduit 14 for withdrawing contaminated fluid adjacent its lower end. A pump 16 driven by a motor 20 draws fluid from the tank 10 through the outlet conduit and discharges this fluid under pressure through a conduit 18 and a valve 22 into the decontaminating apparatus for removal of the collected contaminants and eventual return to the cleaning tank through the inlet conduit 12.

In its primary aspect, the present invention contemplates a new and improved decontaminating apparatus and method wherein the contaminated fluid first is passed through a precleaning station, herein a hydroclone separator 24 in which the fluid is subjected to a cyclonic motion for separation of all solid particles of substantial size by centrifugal action, and then is passed through a final cleaning station for removal of dissolved contaminants by chemical action and of minute solid particles by a polishing or filtering action prior to returning the fluid to the work station 10. By removing larger solid particles prior to passing the fluid through the final cleaning station, the effectiveness and service life of the chemical and filter elements are increased to an extent that makes the use of such elements commercially and economically practical.

Moreover, only a portion of the hydroclone-cleaned fluid is passed through the final cleaning element during each cycle, the remainder being bypassed directly to the work station 10 and combined with fluid that has been passed through the final cleaning elements. In this manner, virtually all of the fluid is subjected to the action of the final cleaning elements during a complete dry-cleaning operation for removal of both dissolved and minute contaminants, but only part of the fluid has to pass through the elements during each cycle of the fluid. This increases the flow capacity of a given apparatus, reduces the back pressure applied to the hydroclone and in the filter and, due to the progressively decreasing concentration of contaminants in the fluid as the cleaning operation progresses, accomplishes the necessary decontamination of the fluid for effective cleaning of each batch of garments.

The construction and operation of hydroclone separators are known to those skilled in the art, and thus will not be given in detail herein. Reference is made, however, to Pat. No. 3,235,090 for a disclosure of a hydroclone separator of a basic type usable as a part of the present invention. In general, such separators comprise an inlet section (see FIG. 2) of circular cross-section into which fluid to be treated is directed tangentially from the conduit 18 to spiral around the wall, downwardly as viewed in FIG. 2, a conical section in which the centrifugal separating force applied to the fluid and the solid particles therein is increased by the progressively decreasing radius of the wall, and an outlet at the apex of the conical section through which a concentrated mixture of solids and fluid is discharged. The discharged solid contaminants pass downwardly through an exit conduit 26 and an isolation section 28 into a receiving or collecting station 30 for eventual disposal, as will be described. According to the effectiveness of the hydroclone design, virtually all of the larger particles over a predetermined size will be removed from the fluid by the hydroclone. After extraction of the larger solid particles, the fluid flows out of the hydroclone separator through an exit conduit 32 opening into the larger end of the separator along the axis of the cone, and is delivered to the final cleaning station by the exit conduit.

The chemical bed cleaner 34 of the final cleaning station is in a form known in the art, and the particular configuration, taken alone, is not part of the present invention. In this cleaner, the fluid is exposed to materials exhibiting adsorptive ion exchange or ionic attraction characteristics, the preferred form being activated charcoal contained in one or more easily handled cartridges. The number of cartridges needed for a particular installation depends upon the volume of fluid that is to be passed through charcoal. The fluid polishing cleaner, indicated at 36, extracts background contaminants and sloughed chemicals from the chemical bed cleaner 34 and also may take a form that is known in the art, preferably being a barrier-type filtering unit comprising one or more cartridges of filter paper of as low as one-half micron effectiveness. While such a unit is preferred because of its simplicity and economy, it will be evident that the possible alternatives include a second hydroclone, an electrostatic precipitator, a mechanical centrifuge, a sonic energy unit (either magnetostrictive or piezoelectric transducer type), a vibratory dispersion unit, or a magnetic unit of either the electro or permanent magnet type.

As shown schematically in FIG. 1, the routing of the fluid through the final cleaning station and the elements 34 and 36 is controlled by a manifold valve arrangement through which various proportions of the fluid may be channeled through the chemical bed, the paper filter and a bypass line connecting conduits 32 and 14, thus leading directly to the work station 10. Valves 38, 40 and 42 are in series with the chemical bed 34 and the filter 36, while valves 44 and 46 are in the bypass line, in parallel with the final cleaning elements, and valves 48 and 50 control fluid flow in connecting conduits providing alternate routes for fluid. Thus, with valves 44, 46, 48 and 50 closed and valves 38, 40 and 42 open, all of the fluid flowing out of the hydroclone 24 can be passed in series through the charcoal bed 34 and the paper filter 36 to conduit 12 and thence to the cleaning station 10. If valves 42, 44 and 50 are opened and valves 38, 40, 46 and 48 are closed, all of the fluid bypasses the charcoal bed and flows only through the filter. On the other hand, with valves 38, 46 and 448 open and valves 40, 42, 44 and 50 closed, all of the fluid flows through the charcoal bed but bypasses the paper filter. With valves 44 and 46 open and valves 38, 42, 48 and 50 closed, both cleaners are bypassed and the fluid flow directly to the cleaning station 10.

In accordance with the invention, the various valves are set to route a preselected portion of the fluid through the chemical bed 34 while the remainder bypasses this cleaning element, and to route another preselected portion, less than the entire flow, through the paper filter 36. With the manifold valve arrangement disclosed, the valves may be set to act as flow restrictors dividing the input flow into any desired set of component flows to pass selected quantities through the charcoal and the filter paper.

For example, assuming a total output of the hydroclone separator 24 on the order of twenty-eight gallons per minute, the valves 38 and 44 may be partially closed to permit approximately twenty-one gallons per minute to flow around the chemical bed 34 while forcing about seven gallons per minute to flow through the valve 38 and the bed. With the valve 48 closed and the valves 50 and 46 partly closed, eleven gallons per minute may be forced to flow through the paper filter 36, this quantity being the flow through the charcoal plus an additional flow taken from the liquid bypassing the charcoal. With the valve 42 open, the flow from the filter is mixed back into the bypass flow prior to recirculation of the fluid through the garments being cleaned.

It has been found that the routing of approximately one-fourth or less of the flow through the charcoal and roughly one-third through the filter is a satisfactory way to operate the system. This reduces the number and size of the final cleaning cartridges required for effective decontamination, and thus reduces the cost of this portion of this apparatus, and also avoids the application of excessive back pressure to the hydroclone and excessive filtering pressure in the filters. Accordingly, the addition of a hydroclone separator to known chemical and filtering units, as a first stage cleaner for removing larger particles from the fluid, together with the division of the hydroclone output into a bypass flow returned directly to the work station and a second flow passed through the final cleaning elements, result in a novel decontaminating apparatus for dry cleaning fluid that is more effective and economical in operation, competitive in cost, and simpler to operate and maintain, as compared with prior systems. With respect to simplicity of operation, it should be noted that the addition of powders is not required, so there is no pre-coat media in the system, and there is no need for backwashing, muck cooking or other complex operations that have been necessary with prior commercial systems.

The mixture of solid particles and liquid passing through contaminant exit conduit 26 passes through an isolation section 28 and into a contaminant receiving station 30. The isolation section 28 may include a valve, either manually or automatically operated, which may be of the gate, plug, butterfly or some similar type, or may include a check valve to permit fluid flow in only one direction, that is, downwardly from the contaminant exit conduit 26 into the contaminant receiving station 30. The contaminant receiving station 30 serves as a collection area for solid contaminants extracted from the fluid.

To permit disposal of the contaminant from the cleaning fluid, it is desirable, in order to prevent waste of the cleaning fluid and minimize handling problems, to first extract fluid and vapors from the contaminant. When fluid and vapors are being extracted from the contaminant receiving station 30, isolation section 28 is closed to prevent contamination with the balance of the decontamination system. Extraction of fluid and vapors from the contaminant receiving station 30 may be practiced in one of four illustrated arrangements, or in a combination of any two or more of the illustrated arrangements.

The first fluid evacuation and devaporization arrangement includes an aspirator 52 having a fluid inlet conduit 54 and a fluid outlet conduit 56 which communicate with conduit 18 to either side of valve 22. When valve 22 is closed, fluid flows through inlet conduit 54, through the aspirator 52 and out through the outlet conduit 56 back into the inlet of hydroclone 24. Aspirator 52 is a device well known in the art wherein fluid flow provides a suction which is applied to conduit 58. This suction is applied through valve 60 and conduit 62 to the interior of the contaminant receiving station 30. Thus, by closing valve 22 and opening valve 60, a suction is applied to the interior of the contaminant receiving station 30. This suction is utilized to remove liquid and/or vapors from the interior of the contaminant receiving station. When the aspirator arrangements is not being utilized, valve 60 is closed and valve 22 is open so that no suction is applied to conduit 62.

The second means of fluid extraction and/or devaporization of the contaminant receiving station 30 includes the use of suction existing at the pump intake conduit 14. Valve 64, when opened, connects conduit 62 by means of conduit 65 into communication with the pump intake conduit 14. The suction applied by the intake of pump 16 is thereby applied directly to the interior of the contaminant receiving station 30. When this arrangement of evacuating a contaminant receiving station 30 is not being used, valve 64 is closed.

The third means illustrated for evacuation and/or devaporization of the contaminant receiving station 30 includes the use of an auxiliary vacuum pump 66 and condenser 67 in the form of a heat exchanger. A valve 68 in conduit 70 controls communication of the vacuum pump 66 with conduit 62 and thereby with the interior of the contaminant receiving station 30. With valve 68 open and vacuum pump 66 energized, fluid and/or vapors are withdrawn from the interior of the contaminant receiving station 30. The withdrawn vapors are condensed by heat exchanger 67 and the condensed liquid is passed into a dump conduit 72 whereby the extracted fluid may be carried away for discharge.

The fourth illustrated vapor evacuation arrangement includes the use of an air blower 74 and heater 76. A valve 78 in conduit 80 controls flow of vapors into heater 76 by the effect of air blower 74. From blower 74, the vapors pass to a condenser 82 wherein the vapors are condensed. Liquid from the condensed extraction vapors is communicated either to the dump conduit 72 or by way of conduit 84 and valve 86 back to the contaminant receiving station 30.

The contaminant receiving station 30 preferably includes a removable bag for holding the contaminants so that after the fluid and vapors have been extracted by the various means heretofore described, the bag may be removed for disposing of the contaminant solids. The bag may be either a disposable or reusable type.

Figure 2:
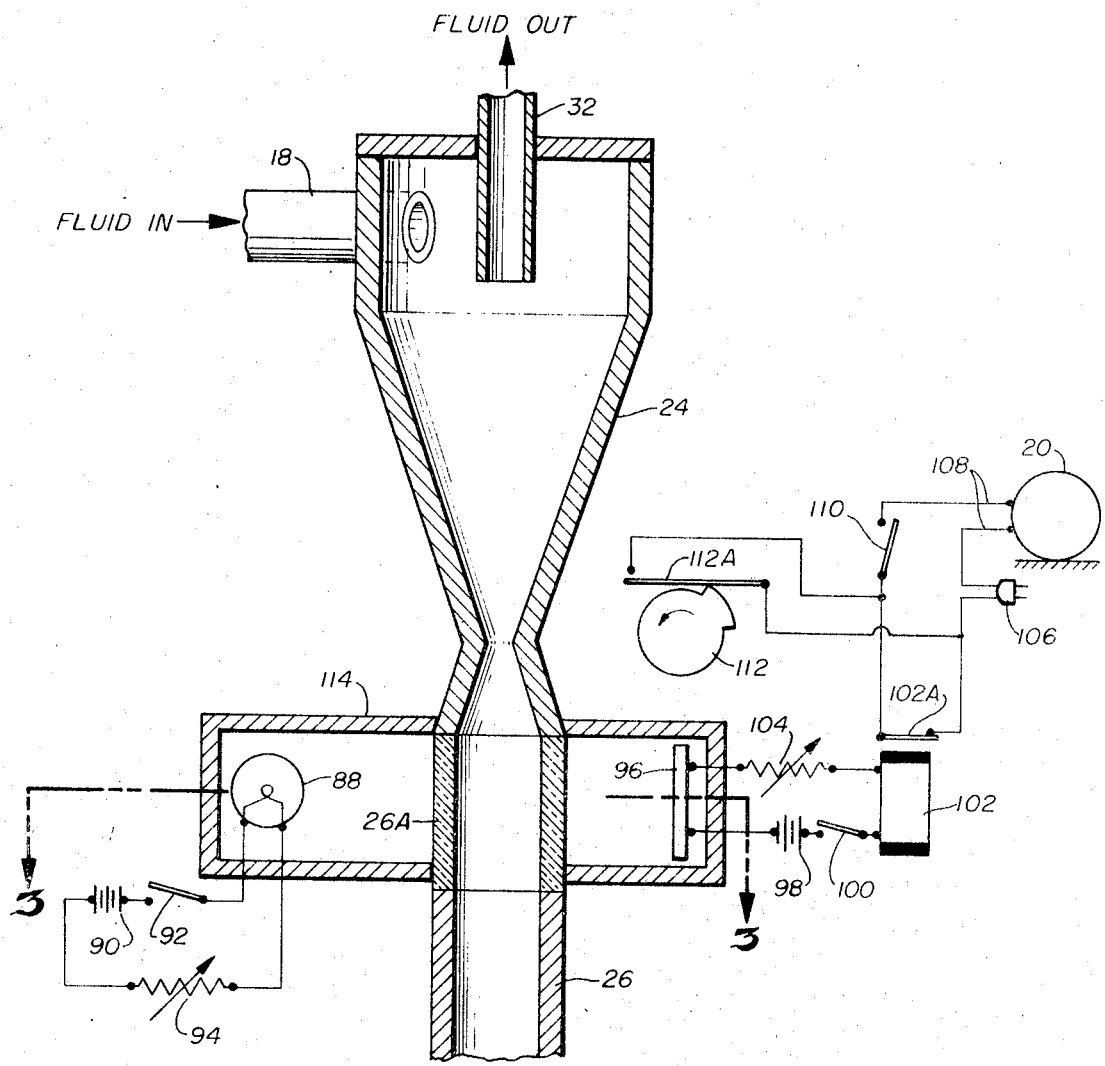
FIG. 2 is an enlarged fragmentary schematic view showing the hydroclone separator of FIG. 1 in cross-section, together with means for automatically terminating the decontamination cycle in response to the condition of the fluid.
Figure 3:
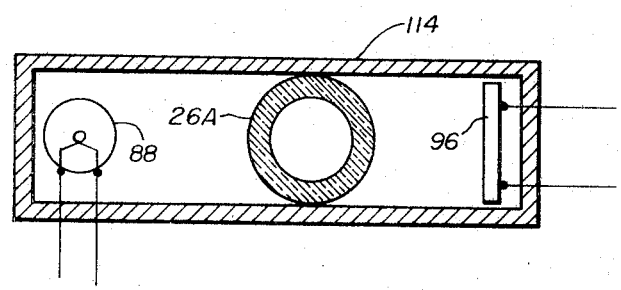
FIG. 3 is a cross-sectional view taken along the line 3—3 of FIG. 2 and showing the relationship of some of the components of the automatic control system of the invention.

Referring now to FIGS. 2 and 3, an arrangement is shown for automatically controlling the fluid decontamination system of this invention. Hydroclone 24 is shown in cross-section and, as previously described, fluid enters the hydroclone by conduit 18, the decontaminated fluid passing out through fluid exit conduit 32 and the contaminant passing out through contaminant exit conduit 26. In this arrangement, a portion 26A of the contaminant exit conduit 26 is formed of transparent material, such as glass or plastic. Positioned adjacent the transparent conduit 26A is a light source 88 which is energized by electrical source 90. A switch 92 and a variable rheostat 94 are in series with the voltage source 90 and battery 88. When switch 92 is closed the light source 88 is energized, the intensity of the light being controllable by rheostat 94.

Also positioned adjacent the transparent portion of the contaminant exit conduit 26A is a photosensitive element 96 having, in electrical series therewith, an electrical source 98, a switch 100, a relay coil 102, and a rheostat 104. Relay coil 102 controls normally closed switch contacts 102A which are in series with an electrical source 106 (exemplified by a plug since the electrical source is normally an AC voltage source) and conductors 108 which extend to connect to the pump motor 20 as shown in FIG. 1. In series with the relay contacts 102A is a switch 110. Paralleling relay contacts 102A are contacts 112A actuated by a time clock mechanism 112.

Enclosing the light source 88, the photoelectric element 96 and at least a portion of the transparent part of the contaminant exit conduit 26, is a light shield 114. The light source 88 and photoelectric element 96 are arranged so that at least a substantial portion of the light falling upon the photoelectric element 96 must pass through the transparent portion of the contaminant exit conduit 26A.

When it is desired to operate the fluid decontamination system switches 92, 100 and 110 are closed and at the same time the clock motor 112 is energized. Clock motor 112 closes contact 112A so that electrical energy is applied to motor 20 to initiate circulation of the fluid through the decontamination system. After a preselected length of time clock switch contacts 112A are opened, so that electrical energy is supplied to a motor 20 through normally closed relay switch 102A. The pump motor 20 will continue to be energized as long as the relay contacts 102A remain closed.

The photoelectric element 96 receives, as previously mentioned, light from source 88 passing through the transparent portion of contaminant exit conduit 26. Contaminant being extracted by the hydroclone 24 and passing downward through conduit 26 opaques the cleaning fluid so that a reduced amount of light strikes the photoelectric element 96. As the contaminant is removed and the fluid attains clarity, an increased amount of light can pass through the transparent portion of the contaminant exit conduit 26A. At a preselected level of fluid clarity the light intensity striking the photoelectric element 96 is such that sufficient current is allowed to pass through it to actuated relay 102. When this occurs switch relay contacts 102A are open and electrical energy to motor 20 is discontinued. The decontamination cycle has then been automatically terminated.

Since the clarity of fluid in the transparent portion of fluid exit conduit 26 will be maintained until new fluid is circulated having contaminant therein, the clock switch 112A is required for a short period to initiate the cleaning cycle. The duration of closure of clock switch 112A is only sufficient to initiate circulation of cleaning fluid so that contaminant is being removed and passed downward through the contaminant exit conduit 26A. Thereafter the system continues to operate as long as contaminant is being removed. As soon as the fluid has been decontaminated and the clarity of the fluid reaches a predetermined level, selectable by the adjustment of rheostats 94 and 104, either singly or in combination, the operation of systems is terminated. In this way the decontamination cycle duration is only that sufficient to attain a preselected level of fluid clarity. Other known systems typically have arrangements wherein the duration of the decontamination cycle is controlled manually, or if automatically, controlled only by a time cycle. Any preselected time cycle may be either too short to attain the desired fluid clarity or longer than necessary in which event not only is energy to operate the decontamination system wasted but wear and tear on the machinery is unnecessarily extended.

When the automatic system as illustrated in FIGS. 2 and 3 is applied specifically to a dry-cleaning process, the decontamination cycle is automatically terminated at the earliest time at which the dry-cleaning fluid flowing through the clothing or other items being cleaned reaches a preselected clarity level. This means that clothing within the cleaning station 10 of FIG. 1, has reached a selected level of cleanliness and the cleaning cycle is terminated at the earliest possible time. In other words, by means of the automatic system of this invention each decontamination cycle is terminated at the earliest possible time at which a preselected level of decontamination has been achieved without the possibility of terminating the cycle too soon and without the waste of time and expense of energy and wear on equipment which arises when the cycle is terminated too late.

While the invention has been described with particularity in regard to the details of construction and operation of the illustrative embodiment, it is manifest that many changes may be made in the details of construction and the arrangement of components without departing from the spirit and scope of this disclosure. It is understood that the invention is not limited by the abstract herein, nor the summary of the invention, nor the described embodiments which are presented for purposes of exemplifying the invention, but is to be accorded the scope of the appended claims including the full range of equivalency to which each element thereof is entitled.

We claim as our invention:

1. A method of decontaminating dry-cleaning fluid used in a closed dry-cleaning system in which the fluid is contaminated in a work chamber by both solid and dissolved contaminants removed from a batch of articles being cleaned, said method comprising the steps of, passing contaminated fluid from said chamber through a hydroclone separator having a first exit for removed solid contaminants and a second exit for cleaned fluid thereby to separate most of the solid contaminants and virtually all of the solid contaminants larger than a selected size from the fluid while producing a flow of cleaned fluid through said second exit, passing a preselected portion of said flow to and through a final cleaning station having cleaning means for removing from the liquid passing through said station selected dissolved contaminants while filtering out selected solid contaminants below said selected size, by-passing the remainder of said cleaned fluid around said final cleaning station, returning both said preselected portion and said remainder to said work chamber for reuse and recirculation through said hydroclone separator, and repeatedly passing said fluid in the above manner through said system whereby said hydroclone separator removes larger solid contaminants from the fluid prior to passing of fluid through said final cleaning station to minimize clogging of said cleaning means and the latter remove a portion of the dissolved contaminants and of solid contaminants below said selected size during each cycle.

2. A method as defined in claim 1 in which said dissolved contaminants are removed by passage of part of the fluid through an activated charcoal bed and said selected solid contaminants are removed by passage of part of the fluid through a paper filter.

3. A method as defined in claim 1 in which said portion and said remainder are mixed together prior to return to said work chamber.

4. A method as defined in claim 1 further including the steps of sensing the clarity of the fluid after cleaning by said hydroclone by said hydroclone separator throughout a cleaning operation, and terminating the cleaning operation in response to attainment of a preselected clarity.

5. A method of decontaminating dry-cleaning fluid used in a dry-cleaning system and containing both solid and dissolved contaminants, said method comprising the steps of: injecting contaminated fluid from said dry-cleaning system into a hydroclone wherein the fluid is subjected to centrifugal forces to separate solid contaminants therefrom by such centrifugal forces, passing the separated solid contaminants out of the hydroclone through a contaminant exit and passing the fluid having solid contaminants removed therefrom out of the hydroclone through a fluid exit, passing part of the fluid from said fluid exit to and through a final cleaning station including a chemical bed cleaner and a barrier filter cleaner, by-passing the remainder of said fluid from said fluid exit around said final cleaning station, returning both said part and said remainder of said fluid to said dry-cleaning system for recirculation therethrough.

6. A method as defined in claim 5 in which said part of said fluid is passed through an activated charcoal bed and a paper filter for removal of dissolved contaminants by said charcoal bed and of small solid particles by said filter.

7. A method as defined in claim 6 in which said fluid is recirculated repeatedly through said system and selected portions of the fluid are passed through said charcoal bed and said filter during each cycle whereby all the fluid is cleaned repeatedly by said hydroclone during each cycle and virtually all of the fluid is subjected to cleaning by said charcoal bed and said filter after several of said cycles.

8. A method as defined by claim 5 in which at least a portion of the fluid passed through one of said cleaners is by-passed around the other of said cleaners.

9. A method of decontaminating fluid, comprising: injecting contaminated fluid into a hydroclone wherein the fluid is subjected to centrifugal forces and wherein solid contaminants are ejected from the solution by such centrifugal forces, the ejected contaminants passing out of the hydroclone through a contaminant exit into a receiving chamber and the fluid having solid contaminants removed therefrom passing out of the hydroclone through a fluid exit; passing the fluid having the solid contaminants ejected therefrom through a chemical bed wherein dissolved contaminants are removed by chemical action; and passing the fluid from the chemical bed through a barrier filter unit wherein any remaining contaminants and any sloughed chemicals from said chemical bed are removed.

10. A method of decontaminating fluid according to claim 9 wherein the fluid is contained in a closed, recycled system, and wherein only a portion of the fluid passing out of the said hydroclone through said fluid exit is bypassed through said chemical bed and said barrier filter unit.

11. A method of decontaminating fluid according to claim 9 wherein said fluid is volatile, such as dry-cleaning fluid, including the step of: devaporizing the contaminants passing out of the hydroclone into said receiving chamber to remove entrained fluid therefrom.

12. A method of decontaminating fluid according to claim 11 wherein the fluid is in a closed system, including the steps of: condensing vapors extracted from the contaminants into fluid; and returning the fluid to the system.

13. A method of decontaminating dry-cleaning fluid used in a closed dry-cleaning system in which the fluid is contaminated in a work chamber by both solid and dissolved contaminants from a batch of articles being cleaned, said method comprising the steps of, passing contaminated fluid from said chamber through a hydroclone separator and removing larger solid contaminants from the fluid in said separator, passing hydroclone-cleaned fluid from said separator to a final cleaning station having chemical bed and paper filter cleaners and passing at least part of said fluid through said cleaners for removal of dissolved contaminants by said chemical bed cleaner and smaller solid contaminants by said paper filter cleaner, returning all of the fluid through said chamber for cleaning of said articles, and continuously circulating fluid through the system until said articles have been cleaned to a selected degree.

14. A method as defined in claim 13 in which a selected portion of said hydroclone-cleaned fluid is bypassed around said final cleaning station and returned directly to said chamber.

15. A method as defined in claim 14 in which approximately one-fourth of said fluid is passed through said chemical bed cleaner and approximately one-third of said fluid is passed through said paper filter cleaner.

16. An apparatus for controlling a fluid decontamination system wherein fluid in a closed system is circulated by a motor driven pump through the decontamination system, comprising: a contaminant extraction means having a first opening wherein contaminated fluid enters, a second opening wherein fluid having contaminants removed therefrom exits, ad a third opening wherein contaminants extracted from the fluid exits; a conduit in communication with said third opening through which said extracted contaminants pass, at least a portion of said conduit being transparent; a photosensitive element adjacent said transparent portion of said conduit; a light source adjacent said transparent portion of said element conduit, said photosensitive element and said light source being arranged so that at least a portion of the light from said light source must pass through said transparent portion of said conduit to strike said photosensitive element whereby the amount of light striking said photosensitive element is determined by the clarity of fluid in said conduit; and circuit means with said photosensitive element for deenergizing said pump motor when the fluid in said conduit reaches a preselected level of clarity.

17. An apparatus, according to claim 16, wherein said photosensitive device is of a type which decreases in resistance in response to increased light intensity and wherein said circuit means with said photosensitive element for deenergizing said pump motor when the fluid in said conduit reaches a preselected level of clarity includes; a relay having contacts in series with said pump motor and a power voltage source, and a voltage source in series with said relay and said photosensitive element whereby said relay contacts are opened when the current flow through said relay reaches a predetermined level in response to decreasing resistance of said photosensitive element as the quantity of light impinging thereon increases in response to increased clarity of fluid in said circuit.

18. An apparatus according to claim 16 including: a variable resistance in series with said relay, said photosensitive device and said control voltage source, said variable resistance providing means of calibrating said apparatus for deenergizing said pump motor in response to preselected level fluid clarity.

19. An apparatus according to claim 17 including: a time actuated switch in parallel with said relay contacts whereby said pump motor may be energized for an initial period during a decontamination cycle.

20. An apparatus for decontaminating dry-cleaning fluid in a closed dry-cleaning system including a work chamber in which said fluid is contaminated by both solid and dissolved contaminants from a batch of articles being cleaned, said apparatus having, in combination, a hydroclone separator having an inlet, a first exit for removed solid contaminants, and a second exit for cleaned fluid; means for injecting contaminated fluid from said work chamber through said inlet for removal of larger solid contaminants and producing a flow of hydroclone-cleaned fluid through said second exit; a final cleaning station having a charcoal cleaner and a paper filter cleaner; conduit means for passing at least part of said hydroclone-cleaned flow through said cleaners for removal of dissolved contaminants by said chemical bed cleaner and removal of smaller dissolved contaminants by said paper filter cleaner; and means returning said fluid to said work chamber for recirculation through said system.

21. Apparatus as defined in claim 20 in which said conduit means includes a bypass conduit from said second exit to said returning means around said cleaners, conduits leading to said cleaners, and flow control means routing portions of said fluid through said cleaners and the remainder directly to said returning means.

22. Apparatus as defined by claim 21 in which said flow control means routes approximately one-fourth of said fluid through said charcoal cleaner and approximately one-third of the fluid through said paper filter cleaner.

23. Apparatus as defined by claim 20 further including a conduit in communication with said first exit, at least a portion of said conduit being transparent, a light source on one side of said transparent portion for directing light through the latter, a photosensitive element positioned to receive light through said transparent portion, and control means for terminating operation of said system in response to attainment of a preselected level of fluid clarity in said transparent portion as sensed by said photosensitive element.

References Cited

UNITED STATES PATENTS

| 2,299,529 | 10/1942 | Crampton | 210—96 |
| 3,281,594 | 10/1966 | Garrison | 210—96 X |
| 3,291,562 | 12/1966 | Anderson | 210—167 X |
| 3,334,516 | 8/1967 | Cedrone | 210—96 X |
| 3,456,797 | 7/1969 | Marriott | 210—74 X |

J. L. DECESARE, Primary Examiner

U.S. Cl. X.R.

210—74, 96, 167, 512